(12) United States Patent
Abraham et al.

(10) Patent No.: US 8,071,220 B2
(45) Date of Patent: Dec. 6, 2011

(54) THERMOPLASTIC VULCANIZATES HAVING IMPROVED ADHESION TO POLAR SUBSTRATES

(75) Inventors: Tonson Abraham, Strongsville, OH (US); Norman G. Barber, Norwalk, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 306 days.

(21) Appl. No.: 11/491,347

(22) Filed: Jul. 21, 2006

(65) Prior Publication Data

US 2008/0021159 A1    Jan. 24, 2008

(51) Int. Cl.
    *C08L 53/02*    (2006.01)
(52) U.S. Cl. ............... 428/476.3; 428/476.9; 525/66
(58) Field of Classification Search .............. 525/66, 525/191, 338; 428/476.3, 476.9
    See application file for complete search history.

(56) References Cited

U.S. PATENT DOCUMENTS

| | | | |
|---|---|---|---|
| 4,957,968 A | 9/1990 | Adur et al. | |
| 5,574,105 A | 11/1996 | Venkataswamy | |
| 5,843,577 A | 12/1998 | Ouhadi et al. | |
| 5,936,039 A * | 8/1999 | Wang et al. | 525/178 |
| 5,955,547 A | 9/1999 | Roberts et al. | |
| 6,028,142 A | 2/2000 | Garois | |
| 6,062,283 A * | 5/2000 | Watanabe et al. | 152/510 |
| 6,300,418 B1 | 10/2001 | Brzoskowski et al. | |
| 6,475,633 B1 * | 11/2002 | Robert et al. | 428/516 |
| 6,663,975 B1 * | 12/2003 | Toyosawa et al. | 428/462 |
| 2004/0014897 A1 * | 1/2004 | Pradel et al. | 525/244 |
| 2004/0132907 A1 | 7/2004 | Nakamura et al. | |
| 2004/0213933 A1 * | 10/2004 | Varma | 428/36.9 |
| 2006/0084764 A1 | 4/2006 | Hanna et al. | |
| 2006/0283314 A1 * | 12/2006 | Cesaroni | 86/54 |
| 2007/0246246 A1 * | 10/2007 | Vilkman et al. | 174/126.2 |
| 2009/0068386 A1 * | 3/2009 | Emad et al. | 428/36.91 |
| 2009/0069487 A1 * | 3/2009 | Gu et al. | 524/505 |

FOREIGN PATENT DOCUMENTS

| | | |
|---|---|---|
| EP | 0 753 027 | 10/1997 |
| GB | 2 107 325 A | 4/1983 |
| WO | WO 95/26380 | 10/1995 |
| WO | WO 00/36011 | 6/2000 |
| WO | WO 00/37553 | 6/2000 |
| WO | WO 00/49088 | 8/2000 |

OTHER PUBLICATIONS

T. Hagiwara et al., "Rapid Communications: Functionalization and Applications of Telechelic Oligopropylenes. II. Introduction of Succinic Anhydride Units and Preparation of Multiblock Copolyolefins by Polycondensation", Journal of Polymer Science Part A: Polymer Chemistry, 2006, vol. 44, pp. 3406-3409.

M. Xanthos et al., "Impact Modification of Aromatic/Aliphatic Polyamide Blends: Effects of Composition and Processing Conditions", Journal of Applied Polymer Sciences, 1996, vol. 62, pp. 1167-1177.

T. Kang et al., "Effects of Amorphous Nylon on the Properties of Poly(Butylene Terephthalate) and 70/30 Poly(Butylene Terephthalate)/Nylon 6 Blends", Polymer Engineering and Science, 1996, vol. 36, Issue 20, pp. 2525-2533.

G. Holden et al., "Styrenic Thermoplastic Elastomers", Thermoplastic Elastomers 2nd Edition, Hauser/Gardner Publications, Inc., Cincinnati, OH, 1996, Ch. 3, pp. 48-68.

G. Moad, "The Synthesis of Polyolefin Graft Copolymers by Reactive Extrusion", Progress in Polymer Science vol. 24, 1999, pp. 81-142.

J. Zimmerman, "Polyamides", Encyclopedia of Polymer Sciences and Engineering, ed. J. Kroschwitz et al., 1988, vol. 11, pp. 315-381.

H. Torre, "Transparent Nylons", Nylon Plastics Handbook, M. Kohan ed., 1995, pp. 377-387.

DuPont Elvamide Resins, Product and Properties Guide, Jun. 2002, pp. 1-20 (downloaded from www.plastics.dupont.com).

V. Smits et al., "SI-Based Technology for Thermoplastic Vulcanizates," TPE 2005 International Conference, Rapra Technology Ltd, RAPRA Technology, Berlin, Germany, Paper 4, Sep. 14-15, 2005, pp. 1-12.

Ohlsson et al., "Improved compatibility between polyamide and polypropylene by the use of maleic anhydride grafted SEBS," Polymer, XP004138360, Dec. 1998, vol. 39, No. 26, pp. 6705-6714.

Oshinski et al., "The role of matrix molecular weight in rubber toughened nylon 6 blends: 2 Room temperature Izod impact toughness," Polymer, XP004069475, Oct. 1996, vol. 37, No. 22, pp. 4909-4918.

* cited by examiner

Primary Examiner — Jeffrey C Mullis
(74) Attorney, Agent, or Firm — Kevin M. Faulkner

(57) ABSTRACT

Thermoplastic vulcanizate compositions having good adhesion to unheated polar substrates include an amount of functionalized polyolefin that comprises greater than 80% of the total polyolefin of the TPV. The functional group may be an anhydride. Exemplary TPVs may further include polyamide, and an elastomer, which may include one or more of conjugated diene rubber, unsaturated styrenic triblock copolymer rubber, hydrogenated styrenic triblock copolymer rubber, ethylene/alpha-olefin rubber, and ethylene/alpha-olefin/non-conjugated diene rubber. The TPVs may have hardness values of less than 85 Shore A and peel forces with respect to unheated polar substrates of greater than 15 pli. Articles comprising polar substrates and TPVs are also taught.

24 Claims, No Drawings

THERMOPLASTIC VULCANIZATES HAVING IMPROVED ADHESION TO POLAR SUBSTRATES

I. BACKGROUND OF THE INVENTION

A. Field of Invention

This invention relates to and discloses thermoplastic vulcanizate compositions having improved adhesion to polar materials and substrates, without requiring pre-treatment, or pre-heating of the polar materials or the use of additional adhesives.

B. Description of the Related Art

Thermoplastic vulcanizates ("TPVs") are a fine dispersion of highly vulcanized rubber particles in a continuous phase of a thermoplastic, which is typically a polyolefin. TPVs are traditionally made by blending a rubber with a semi-crystalline thermoplastic under conditions that allow for the dynamic vulcanization of the rubber. The result is a material comprised of a continuous plastic phase formed by the polyolefin and interspersed with discrete, crosslinked rubber particles, which form a rubber phase. TPVs have the benefit of the elastomeric properties provided by the rubber phase, with the processability of thermoplastics.

It is often desirable to overmold polar substrates, including metal and plastics such as nylon, with TPVs. However, TPVs are typically non-polar, which presents challenges when overmolding TPVs onto polar substrates, as adhesion between non-polar TPVs and polar substrates is generally poor. Existing methods of improving TPV adherence to polar substrates involve pre-treating the substrate surfaces to improve adhesion or bonding. Pretreatment methods may include solvent etching, sulfuric acid or chromic acid etching, sodium treatment, ozone treatment, flame treatment, UV irradiation, and plasma treatment. These procedures are costly, use hazardous materials, result in product degradation, and create environmental hazards.

Other approaches to improving the adherence of TPVs to polar substrates include the use of adhesives, and "mechanically" locking the TPV layer onto the substrate. The use of adhesives increases cost and production time. Mechanical approaches to improving adherence involve processing or specially forming the substrate, for example, by forming channels in the substrate into which the TPV can flow, solidify, and thereby lock the TPV layer in place the substrate.

Still other efforts include those described in U.S. Pat. No. 4,957,968 in which adhesive thermoplastic elastomer compositions comprised of blends of an elastomeric copolymer or terpolymer, polyolefin, and an amount of a chemically modified polyolefinic polymer, exemplified by maleic grafted anhydride polypropylene, are applied to substrates.

Preparation of TPVs with improved high temperature elastic recovery over conventional TPVs (iPP/EPDM), by the dynamic vulcanization of ethylene/alpha-olefin rubber in maleic anhydride grafted polyolefins is described in U.S. Pat. No. 6,028,142.

WO 95/26380 involves the blending of so-called adhesion promoters to a preformed thermoplastic elastomer. According to this patent publication, the adhesion promoter is the reaction product of a functionalized polyolefin (such as maleated polypropylene) and a polyamide. This grafted nylon-MAH-PP blended with the selected thermoplastic elastomer to yield the so-called adhesive product.

U.S. Pat. No. 6,300,418 discloses functionalized rubber, exemplified by a maleic anhydride graft thermoplastic rubber, rather than functionalized polyolefin (as in the WO 95/26380 publication), which is blended with a polyamide to form an adhesion promoter that is in turn blended, in amounts of between 2 and 60 weight %, with a thermoplastic elastomer composition.

All of the above-mentioned methods at improving adhesion suffer drawbacks that limit the overall combination of adhesive properties and physical properties. One deficiency, for example in WO 95/26380, is that blending the nylon/PP-g-MAH melt blend with the selected thermoplastic elastomer increases the overall hardness of the resulting thermoplastic elastomers. In order to maintain a desirable level of hardness, additional additives to the composition, such as a block copolymer of styrene/conjugated diene/styrene, are used. Compensating for the increase in hardness by starting with or adding amounts of a lower hardness thermoplastic elastomer may result in a product exhibiting an inferior combination of physical and adhesive properties.

Additionally, in the above mentioned efforts, heating of the substrate is often a predicate step to achieving good adherence of the TPV to the substrate. Heating the substrate prior to overmolding is not always practical and adds additional manufacturing steps that increase cost and time. It would be desirable to achieve good adherence without having to heat the substrate.

Finally, many of the above referenced approaches are premised on the addition of materials, sometimes referred to as adhesion promoters, to existing TPVs or blends of unmodified elastomer and unmodified polyolefin. As noted, commercially available TPVs comprising unmodified or non-functionalized elastomer and plastic phases generally have poor adherence to polar substrates. The presence of significant amounts of unmodified elastomer or plastic will limit the adherence that can be achieved merely by dilution with functionalized polyolefin.

It would also be desirable to provide TPV compositions having a plastic phase that imparts a relatively low melt viscosity to the TPV so as to improve the flow of the TPV over the substrate and so as to improve the physical contact of the TPV to the substrate. Additionally, it would be desirable to provide TPVs having a relatively slow crystallization rate so as to maximize contact time between the TPV and the substrate surface prior to crystallization.

II. SUMMARY OF THE INVENTION

An aspect of the present invention is directed to a thermoplastic elastomer comprising an elastomer comprising a rubber selected from the group consisting of conjugated diene rubber, unsaturated styrenic triblock copolymer rubber, hydrogenated styrenic triblock copolymer rubber and blends thereof; and a plastic phase comprising greater than 80% by weight of an anhydride functionalized polyolefin; wherein the polyolefin is selected from the group consisting of polypropylene, polyethylene, poly(1-butene), poly(4-methyl-1-pentene) and blends thereof.

Another aspect of the present invention is directed to a thermoplastic vulcanizate comprising an elastomer comprising a rubber selected from the group consisting of ethylene/alpha-olefin rubber, ethylene/alpha-olefin/non-conjugated diene rubber and blends thereof; a plastic phase comprising greater than 80% by weight of an anhydride functionalized polyolefin; wherein the polyolefin is selected from the group consisting of polypropylene, polyethylene, poly(1-butene), poly(4-methyl-1-pentene) and blends thereof; and a polyamide.

Yet another aspect of the present invention is directed to a thermoplastic elastomer comprising an elastomer comprising a rubber selected from group consisting of conjugated diene rubber, unsaturated styrenic triblock copolymer rubber, hydrogenated styrenic triblock copolymer rubber, ethylene\alpha-olefin rubber, ethylene\alpha-olefin\non-conjugated diene rubber and blends thereof; and a plastic phase comprising a polyolefin and a polyamide, wherein the polyolefin comprises greater than 95% by weight of a functionalized polyolefin, and wherein the functional group in the functionalized polyolefin is maleic anhydride.

Yet another aspect of the present invention is directed to a method of bonding thermoplastic elastomer and a substrate, the method comprising contacting the thermoplastic elastomer with the substrate, the substrate at a temperature of from less than 40° C., the thermoplastic elastomer comprising an elastomer comprising a rubber selected from the group consisting of conjugated diene rubber, unsaturated styrenic triblock copolymer rubber, hydrogenated styrenic triblock copolymer rubber and blends thereof; and a plastic phase comprising greater than 80% by weight of an anhydride functionalized polyolefin; wherein the polyolefin is selected from the group consisting of polypropylene, polyethylene, poly(1-butene), poly(4-methyl-1-pentene) and blends thereof.

Yet another aspect of the present invention is directed to an article of manufacture made using any of the thermoplastic elastomers or thermoplastic vulcanizate embodiments described herein, wherein the thermoplastic elastomers or thermoplastic vulcanizate are bound to a substrate to form the article of manufacture.

III. DETAILED DESCRIPTION OF THE INVENTION

One aspect of the invention is directed to a thermoplastic vulcanizate comprising:

(a) an elastomer, which may include one or a blend of more than one polyolefinic rubber, and (b) a polyolefin, which comprises greater than 80% by weight of the total amount of polyolefin of one or a blend of more than one functionalized polyolefins, wherein the functional group is selected to improve adherence of the TPV to a polyamide substrate.

The thermoplastic vulcanizates of the present invention may further include at least one polyamide which, in combination with the functionalized polyolefin, may form the plastic phase of the TPV. The polyamide may be grafted onto the functionalized, non-elastic polyolefin.

One or more common additives may added to the TPV to affect the characteristics or processability of the TPV.

The functional group in the functionalized polyolefin may be an anhydride, and is preferably maleic anhydride ("anhydride functionalized polyolefin"). The thermoplastic elastomer may have a hardness of between 35 and 75.

The thermoplastic elastomer may have a peel adhesion to a polyamide substrate at room temperature of greater than 15 pounds per linear inch. This peel adhesion may be achieved by over molding the polyamide substrate without heating the substrate.

As noted above, the TPV comprises an elastomer. The amount of the elastomer in the TPV as a percentage by weight of the total amount of the elastomer plus plastic, including polyamide, in the TPV may be from 20% to 80% weight, and in another embodiment, from 30% to 70% by weight, and in yet another embodiment, from 40% to 60% by weight, and in a preferred embodiment, from 35% to 65% by weight.

The elastomer may comprise a single rubber or a blend of rubbers. Suitable rubbers according to the present invention may include conjugated diene rubbers, unsaturated styrenic triblock copolymer rubbers, hydrogenated styrenic triblock copolymer rubbers, and ethylene/alpha-olefin rubbers, including ethylene/alpha-olefin/non-conjugated diene rubber.

Conjugated diene rubber may include styrene/butadiene rubber, polybutadiene rubber, polyisoprene rubber, and blends thereof, with styrene/butadiene rubber being preferred. Unsaturated styrenic triblock copolymer rubber may include styrene/isoprene/styrene "SIS" and styrene/butadiene/styrene "SBS" rubber. Hydrogenated styrenic triblock copolymer rubber may include SEEPS, SEPS, SEBS and blends thereof. Ethylene/alpha-olefin rubber may include copolymers of ethylene and $C_3$-$C_8$ α-olefins. Ethylene/alpha-olefin/non-conjugated diene rubber exemplified by EPDM rubber, refers to terpolymers of ethylene, $C_3$-$C_8$ alpha-olefins and non-conjugated diene.

The term "rubber" as used herein means any natural or synthetic polymer which can be vulcanized or cured so as to exhibit elastomeric properties. The term "elastomer" may be interchange with the term rubber.

The term "polyolefin" refers to homopolymers and copolymers of $C_2$-$C_8$ olefins. The term "plastic phase" with respect to the TPV composition refers to the inelastic phase of the TPV and comprises the polyolefin and, where present, the polyamide.

SB rubber refers to random block copolymers of styrene and butadiene. The SB rubber may have a styrene content of between 1% to 50% by weight of the SB rubber. Styrene content of between 15% and 45%, and preferably between 20% and 40%, and still more preferably between 20% and 30% are also contemplated in accordance with the present invention. Suitable butadiene micro structures may include 1,2-butadiene, and cis and trans 1,4-butadiene. The copolymer may be prepared in any of the well known conventional processes, such as through solution or emulsion polymerization. The weight percent of the butadiene in the SB rubber may range from 50% by weight to 99% by weight. Weight percents of butadiene in the SB rubber of between 85% and 55%, and preferably between 80% and 60%, and still more preferably between 80% and 70% are contemplated in accordance with the present invention. Larger or smaller amounts of butadiene may be employed. The butadiene portion may contain from 10% to 90% of 1,2-polybutadiene, with the remainder consisting essentially of cis and trans 1,4-polybutadiene. The ratio of cis to trans isomers in the 1,4-polybutadiene may be between 0.2 and 0.65. The molecular weight, on a number average value, may be from 30,000 to greater than one million.

PB rubber refers to homopolymers of butadiene having a cis-1,4-butadiene content as low as 5% to as high as 98% by weight. PB rubber also refers to homopolymers of butadiene having a vinyl-1,2-butadiene content as low as 2% and as high as 90% by weight. The molecular weight, on a number average value, may be from 30,000 and greater than one million.

Polyisoprene rubber refers to homopolymers of isoprene, including natural rubber. Polyisoprene rubber may have a cis-content as low as 5% to as high as 98% by weight. The molecular weight, on a number average value, may be from 30,000 and greater than one million.

Ethylene/alpha-olefin rubber refers to copolymers of ethylene and $C_3$-$C_8$ alpha-olefins exemplified by EPM rubber, which is an ethylene propylene copolymer rubber which can be crosslinked by radiation or peroxide. Ethylene/alpha-olefin/non-conjugated diene rubber refers to terpolymers of ethylene, $C_3$-$C_8$ alpha-olefins, and non-conjugated diene, exemplified by an EPDM rubber. Illustrative non-limiting examples of suitable non-conjugated dienes are 5-ethylidene-2-norbornene (ENB); 1,4-hexadiene; 5-methylene -2-norbornene (MNB); 1,6-octadiene; 5-methyl-1,4-hexadiene; 3,7-dimethyl-1,6-octadiene; 1,4-cyclohexadiene; tetrahydroindene; methyltetrahydroindene; dicyclopentadiene; 5-isopropylidene-2-norbornene; 5-vinyl-norbornene; etc. The ethylene content of the ethylene/alpha-olefin and ethylene/alpha-olefin/non-conjugated diene rubber may be from 25% to 80% by weight, with weight percents of between 30% and 70%, and preferably 45% and 65%, and still more preferably 50% and 60% contemplated in accordance with the present invention. The non-conjugated diene content when present may be from 2% to 10% by weight, with the remaining content being substantially alpha-olefin. The molecular weight, on a number average value, may be from 30,000 and greater than one million.

SIS and SBS rubber refer to styrene/isoprene/styrene and styrene/butadiene/styrene triblock copolymer elastomers respectively. These rubbers are styrenic triblock copolymers having a conjugated diene midblock based on butadiene or isoprene and may be referred to herein collectively as unsaturated styrenic triblock copolymer rubbers.

Hydrogenated styrenic triblock copolymer elastomers, exemplified by SEBS (styrene/ethylene-butylene/styrene), SEPS (styrene/ethylene-propylene/styrene), SEEPS (styrene/ethylene-ethylene-propylene/styrene) are widely commercially available and are described in further detail in US 2004/0132907. As noted in the aforementioned reference, hydrogenated styrenic triblock copolymers may include crosslinkable styrenic blocks, which, in combination with the crosslinkable midblocks, may afford greater overall crosslinking of the cured elastomer within the TPV. These elastomers may have a styrene content as low as 10% by weight to as high as 50% by weight, preferably 20% and 40% by weight, and most preferably from 25% to 35% by weight. The molecular weight of the styrene component may be from 7,000 to 50,000 and the molecular weight of the elastomeric component may be from 30,000 to greater than 150,000. Methods of forming suitable hydrogenated styrenic triblock copolymer elastomers are well known in the art. See, G. Holden and N. R. Legge, "*Styrenic Thermoplastic Elastomers*", in THERMOPLASTIC ELASTOMERS (eds. G. Holden, N. R. Legge, R. Quirk, and H. E. Schroeder, Hauser/Gardner Publications, Inc., Cincinnati, Ohio, 1996) Ch. 3.

The elastomer of the exemplary TPVs may include any one or blend of more than one of the above rubbers. In the preferred embodiment, the elastomer may comprise ethylene/alpha-olefin/non-conjugated diene rubber, most preferred being EPDM rubber. The exemplary EPDM rubber is VX1696 offered by ExxonMobil Chemical Co.

The TPV may further comprise a plastic phase. In one embodiment the plastic phase may comprise a functionalized polyolefin. Another embodiment, the plastic phase may comprise a functionalized polyolefin and a polyamide. The amount of the plastic phase of the TPV as a percentage by weight of the total amount of the elastomer plus the plastic phase may be from 20% to 80%, and another embodiment from 30% to 70% by weight, and in yet another embodiment from 40% to 60% by weight, and in still a more preferred embodiment from 35% to 55% by weight.

In yet another embodiment, the plastic phase may comprise a functionalized polyolefin, a nonfunctionalized polyolefin and a polyamide. In this embodiment, it is preferable that at least 80% by weight of the total polyolefin comprises one or a blend of more than one functionalized polyolefin.

The term "functionalized polyolefin" refers to a polyolefin containing reactive functional groups. Suitable polyolefins include isotactic polypropylene ("iPP"), homopolymers of ethylene, including high density polyethylene, low density polyethylene, very low density polyethylene, ethylene/propylene copolymer, ethylene/1-butene copolymer, ethylene/1-hexene copolymer, ethylene/1-octene copolymer (collectively, the polyethylene homopolymers and copolymers are referred to as "polyethylene" unless otherwise stated); isotactic poly(1-butene) and copolymers of 1-butene with ethylene, propylene, 1-hexene, or 1-octene (collectively, the isotactic poly(1-butene) homopolymers and copolymers are referred to as "isotactic poly(1-butene)" unless otherwise stated); and syndiotactic polypropylene and copolymers of syndiotactic propylene with ethylene, 1-butene, 1-hexene, or 1-octene (collectively, the syndiotactic propylene homopolymers and copolymers are referred to as "syndiotactic propylene" unless otherwise stated), ands blends of the aforementioned. Functionalized poly(4-methyl-1-pentene) and copolymers thereof are also useful in the present invention.

Functional groups (also referred to as reactive groups) may include carboxylic acids and their derivatives, including acid anhydrides, acid chlorides, isocyanates, oxazolines, amines, hydroxides, and epoxides. For purposes of the present invention, the preferred functional group is an anhydride and most preferably maleic anhydride.

These reactive groups can be on the polyolefin polymer backbone, such as in copolymers of styrene and maleic anhydride available from NOVA Chemicals, under the trademark Dylark™ or the reactive groups may be grafted onto the main polyolefin backbone. Examples include polypropylene grafted with maleic anhydride available from Eastman Chemicals as Epolene E-43™, or polypropylene or polyethylene grafted with acrylic acid or maleic anhydride available from Chemtura Corp under the trademark POLYBOND, or Exxelor™ from ExxonMobil, or Fusabond™ which includes maleated isotactic polypropylene and maleated propylene/ethylene random copolymers from E. I. du Pont de Nemours and Company.

Many of these functionalized polyolefins are marketed directly as grafted copolymers or as blends. Examples of blends include Plexar™ grades from -Equistar Chemical Co., Bynel™ grades from DuPont, Modic™ and Novatec™ from Mitsubishi, Admer™ from Mitsui, and Lupolen™ from Basell B.V.

Isotactic polypropylene modified with an anhydride, and preferably maleic anhydride is an exemplary functionalized non-elastic polyolefin. This product may be referred to as maleated isotactic polypropylene or iPP-g-MAH. The modified isotactic polypropylene may be grafted with between 0.5% to 2.0% by weight of maleic anhydride. The weight percent of maleic anhydride may exceed 2.0%. In another embodiment, the weight percent of maleic anhydride may be from 0.75% to 2.0% and in another embodiment, from 1.0% to 2.0% and in still another embodiment, from 1.0% to 1.5% and in still another embodiment, from 0.5% to 1.0%. iPP-g-MAH having 1.0% maleic anhydride is sold by Chemtura Corporation under the trademark POLYBOND 3000.

Though iPP-g-MAH is preferred, other functionalized polyolefins referred to herein, including other maleated polyolefins, may be incorporated into the TPVs of the present invention. The synthesis of polyolefin graft copolymers, including those containing MAH grafts, is reviewed by T. Hagiwara et al., 44 JOURNAL OF POLYMER SCIENCE PART A: POLYMER CHEMISTRY, 3406-3409 (2006); and G. Moad in PROGRESS IN POLYMER SCIENCE Ch. 24, 81-142 (1999). Functionalized polyolefins having levels of functionality greater than 2%, as described in US 2006-0084764A1 to Hana et al., which teaches MAH functionalized polyolefins having a MAH content greater than 2 wt %, may be used in the present invention.

In one embodiment of the invention, the polyolefin of the TPV comprises greater than 80% by weight of the total polyolefin of one or a blend of more than one functionalized, and preferably, anhydride functionalized polyolefin.

In another embodiment, the polyolefin comprises greater than 90% and in yet another embodiment, greater than 95% and in still another embodiment, greater than 97% of one or a blend of more than one functionalized polyolefin. In a preferred embodiment, the polyolefin consists essentially of one or a blend of more than one functionalized polyolefin.

It is contemplated that the polyolefin will comprise greater than 80%, and in other embodiments, 90%, 95% and 97% respectively, by weight of functionalized polyolefin, preferably anhydride functionalized polyolefin. This restriction is intended to define a upper limit on the amount of unmodified polyolefin (i.e., polyolefin chains having no functional group graft along the polymer chain) which may be added to the TPV composition and more specifically, to iterate that preferably, no more than 20% by weight, and in other respective embodiments, 10%, 5%, and 3%, of the polyolefin added to the TPV will be unmodified polyolefin. It will be recognized that commercially available functionalized, polyolefins having greater than 0.5% by weight of maleic anhydride, including the POLYBOND 3000 referenced herein, may have an amount of unmodified polyolefin chains, though it will be noted that when maleic anhydride level in the polyolefin is greater than 0.5 weight percent it is generally believed that there is essentially no unmodified polyolefin chains. It is preferable that the selected commercially available functionalized polyolefin not have a known concentration of unmodified polyolefin chains that is greater than 20%, and preferably 10%. Moreover, it will be recognized that processing the TPV, which may involve significant shearing forces and heat, may break apart some portion of the functionalized polyolefin strands to form unmodified polyolefin chains. It is believed that the combination of these two effects will not introduce more than 20% by weight of unmodified polyolefin chains into the total polyolefin portion of the TPV; nevertheless, when referring to the composition of the polyolefin or the TPV, the lower limit of 20%, and in other embodiments, 10%, 5% and 3% of unmodified polyolefin refers to the sum of all sources unmodified polyolefin.

In the most preferred embodiment, substantially the entire plastic phase comprises functionalized polyolefin; namely polypropylene, grafted with between 0.5% to 2.0% percent by weight of maleic anhydride. The term "substantially the entire polyolefin" means that preferably no unmodified polyolefin, other than that which may be incidental to the functionalized polyolefin, is intentionally incorporated into the TPV.

The plastic phase of the TPV may comprise a polyamide in addition to the polyolefin. An amount of polyamide may be added to the TPV composition to improve the affinity of the TPV with respect to polyamide substrates. Where present the amount of the polyamide (weight percent with respect to the total plastic plus polyamide in the plastic phase) may be from 20 to 80% by weight and preferably from 30 to 70% by weight and still more preferably from 40 to 60% by weight.

In principle, all types of polyamides are useful in certain aspects of the invention. The polyamides may include at least the aliphatic polyamides, for example polyamide-4, polyamide-6, polyamide-8, polyamide-12, etc., polyamide-4,6, polyamide-6,6, polyamide-6,10, etc., all amorphous polyamides, which may be derived from an aliphatic diamine and an aromatic dicarboxylic acid, for example polyamide-4,T, polyamide-6,T, polyamide-4,I, etc., in which T stands for terephthalate and I for isophthalate (further exemplified by Zytel 330 from E.I. DuPont De Nemours and Company, described by M. Xanthos, J. F. Parmer, M. L. LaForest, and G. R. Smith in 62 JOURNAL OF APPLIED POLYMER SCIENCES, 1167 (1996), copolyamides of linear polyamides and copolyamides of an aliphatic and a partially aromatic polyamide, for example 6/6,T, 6/6,6/6,T, etc. Polyamide-6 and polyamide-6.6 are preferred. The classes of polyamides described above are further detailed in 11 ENCYCLOPEDIA OF POLYMER SCIENCES AND ENGINEERING, 315-381 (J. I. Kroschwitz, ed., John Wiley, New York, N.Y., 1988), and NYLON PLASTICS HANDBOOK 377-387 (M. I. Kohan, Ed., Hauser\Gardner Publications, Inc., Cincinnati, Ohio, 1995), which are both incorporated by reference. All-amorphous polyamides may also be produced by the copolymerization of aliphatic monomer precursors for polyamides as documented by T. K. Kang, Y. Kim, W. J. Cho, and C. S. Ha in 36(20) POLYMER ENGINEERING AND SCIENCE 2525 (1996). Suitable aliphatic, all-amorphous polyamides are available from Kolon Company, Korea.

Nylons having hardness values of less than 90 (Shore D) and preferably less than 85 may be used. In other embodiments, softer TPVs may be formed using nylons having hardness values of less than 80 and preferably less than 75.

Polyamide elastomers, including polyether block amides (e.g., Pebax™ available from Arkema) may also be used in the subject compositions in place of, or in addition to, the polyamide of the plastic phase, particularly where it is desirable to reduce the hardness of the resulting TPV. Polyamide elastomers are described in THERMOPLASTIC ELASTOMERS Ch. 9 (G. Holden, H. R. Kricheldorf, and R. P. Quirk, eds., Hansen/Gardner Publications, Cincinnati, Ohio, 2004). Suitable polyamide elastomers may have hardnesses ranging from 25 to 70 Shore D.

The adhesive performance of the TPV with respect to polar substrates, and specifically polyamide substrates may be improved by reducing the melt viscosity of the TPV so as to improve the flow of the TPV over the substrate and so as to facilitate the flow of the TPV into the various undulations and imperfections on the substrate surface. TPV melt viscosity is dependent on the melt viscosity of the plastic phase and is therefore controlled by the melt viscosity of the polyolefin and, where present, the polyamide. To that end, it may be desirable in one embodiment to select a functionalized polyolefins having a relatively high melt flow rate. Preferably the melt flow ratio of the functionalized polyolefin as defined under ASTM D1238 (230° C., 2.16 kg) is between approximately 600 and 100, with a melt flow rate of between 500 and 200 g/10 min preferred, and a melt flow rate of between 475 and 350 g/10 min more preferred, and a melt flow rate of between 475 and 375 g/10 min being most preferred. Exemplary functionalized polyolefins in this range include POLYBOND 3000 which is a 1.1% by weight maleated isotactic polypropylene having a melt flow rate of approximately 400 g/10 min, and FUSABOND P MD 353 D which is a maleated propylene\ethylene random copolymer chain having a high maleic anhydride content (greater than 1.5 wt %), and a melt flow rate of approximately 450 g/10 min.

Maleated product from branched polypropylenes such as PF814 from Basell Polyolefins or Daploy™ WB130HMS from Borealis may be useful in the present invention as these materials would exhibit the high flow characteristics of the parent polyolefins under injection overmolding conditions.

Higher molecular weight, and therefore lower melt flow rate, functionalized polyolefins may be suitable for the practice of this invention if the polyolefins are highly functionalized, as the adverse effect on adhesion due to poor TPV melt wetting characteristics is counteracted by the increased functional group content in the polyolefin. These TPVs, then, would have improved mechanical properties, in addition to exhibiting good adhesion in overmolding. High molecular weight polypropylene containing a high maleic anhydride graft level is described in U.S. Pat. No. 5,955,547 to Roberts et al., and may be used in place of part or all of the conventional functionalized polyolefins described herein.

To reduce melt viscosity of the plastic phase of the TPV, it may also be desirable to select a polyamide having a relatively low melt viscosity. In one embodiment the polyamide may have a relative viscosity as measured in 90% formic acid, in accordance with the process described in the DuPont Elvamide® Product and Properties Guide, (2004), of between 20 to 200, with a relative viscosity of 20 to 100 being preferred, and 20 to 50 being most preferred. Typical commercially available injection molding grades of nylon are preferred and are within the preferred range of relative viscosities.

To further reduce the viscosity of the polyamide, a polyamide plasticizer may be added to the thermoplastic elastomer composition. Polyamide plasticizers may be added in amounts from 0.1% to 25% by weight with respect to the polyamide and preferably from 5% to 25% and most preferably 10% to 15% with respect to the polyamide. Exemplary nylon plasticizers include N-(n-butyl)benzenesulfonamide and 2-ethylhexyl-4-hydroxy benzoate.

Improvement in the adhesive properties of the TPVs of the present invention, with respect to polar, and specifically, polyamide substrates may also be achieved by selecting, as the functionalized plastic, functionalized copolymers of alpha-olefins and acrylate monomers. The exemplary alpha-olefin may be ethylene. Exemplary acrylate monomers may include butyl acrylate, 2-ethylhexyl acrylate, methyl acrylate, ethyl acrylate, acrylonitrile, and methyl methacrylate monomers. The functionalized plastic may also include functionalized copolymers of ethylene and vinyl acetate. These plastics, that are more polar than the maleated polyolefins previously discussed, would exhibit increased adhesion to the nylon substrate surface because of the additional polar interaction between the pendant ester groups of the plastic and nylon. One example of such a plastic is a maleic anhydride functionalized copolymer of ethylene and butylacrylate, which is sold under the tradename Fusabond AEB560D, available from DuPont. This material has a melt index of 5.6 g/10 min (190° C., 2.16 kg). These plastics may be used in place of part or all of the plastic phase of the TPV composition.

Maleated plastic hardness can be used as one of the tools to control end product hardness. In this connection, maleated ethylene/acrylate copolymers, maleated propylene/ethylene copolymers, and maleated poly(1-butene), would reduce product hardness when used in place of maleated polypropylene for TPV preparation.

The adhesive property of the TPV of the present invention may be improved by the selection of low crystallinity polyamides, as it is expected that the greater the amorphous phase content of the nylon in the TPV, the better the adhesion of the TPV to the nylon substrate. Rates of crystallization may also be lower, the lower the nylon crystallinity, thus allowing adhesive property improvement due to increased wetting time of the substrate surface by the molten TPV. A standard nylon 6 grade such as Ultramid B3 may have 35% to 40% crystallized structure. Polyamides having a percent crystalline structure of less than 30% and in another embodiment less than 25% and in still another embodiment less than 20% and in yet another embodiment of 15% may be selected. An exemplary polyamide having a percent crystalline form of 15% is Elvamide 8066. This polyamide also has a low relative viscosity of 21 to 29. The rise of softer, lower crystallinity nylon is another tool that can be used to reduce TPV hardness.

Classes of high molecular weight, but yet high flow polyamide and polyamide blends (i.e., having low melt viscosities) are known in the art and may be selected for use in the thermoplastic vulcanizate compositions of the present invention in place of conventional polyamides. These polyamides may have number average molecular weight in the range of 25,000 to 80,000 but a relative melt viscosity of less than 50, and preferably from 20 to 50.

The present thermoplastic elastomer composition can include, if desired, one or more additives. Suitable additives may include, among others known in the art, reinforcing and non-reinforcing fillers, fibers (like glass, carbon fibers or carbon fibrils), processing oils, extender oils, rubber and polyamide plasticizers, including those previously described, waxes, stabilizers, antioxidants, cross-linking agents, processing aids, lubricants, foaming agents, flame retardant packages, pigments and other coloring agents. Fillers and extenders which can be utilized include conventional inorganic substances, such as calcium carbonate, clays, silica, talc, titanium dioxide, carbon black and the like. Some materials, such as some fillers, can serve a plurality of functions. For instance, antimony trioxide can function as a filler and also provide, preferably in combination with other materials, some flame retardancy to the present thermoplastic elastomer composition. In general, suitable rubber processing oils are paraffinic, naphthenic or aromatic oils derived from petroleum fractions and one used in amounts from 0 to 250 phr, and preferably 25 to 200 phr and still more preferably 50 to 150 phr and most preferably, less than 150 phr. The type of the oil selected can be one that ordinarily is used in combination with the specific rubber or rubbers in the present composition. It is generally desirable to use processing oils to improve processability by reducing viscosity and increasing melt flow. Increased melt flow improves good wetting of the adhesion substrate; however, the processing oil in the TPV may compete with the molten adhesive component, such as the functionalized plastic, for the substrate surface. Hence, the amount of oil added to improve TPV melt flow is preferably balanced with the amount of adhesive plastic present in the formulation. Adjusting TPV oil content is yet another tool to produce softer TPVs. For polyolefin rubbers, the preferred plasticizers are paraffinic oil (such as Chevron 6001R) and polyisobutylene oil, and naphthenic oil. The use of polyisobutylene oil may allow softer products when used in the same amount as paraffinic or naphthenic oil in a TPV formulation. Alternatively, a lower polyisobutylene oil level may allow the preparation of TPVs with equivalent hardness to TPVs containing a higher paraffinic or naphthenic oil level, thus allowing improved adhesion in overmolding, for the former TPVs. Examples of polyisobutylene oils that are suitable for preparing the TPVs of this invention are Indopol™ H 100, H 1900, and H 18,000, that are available from Innovene USA.

In a preferred embodiment, the elastomer may be fully cured. The term "fully cured" or "fully vulcanized" relative to the dynamically vulcanized rubber component of this invention denotes that the rubber component to be vulcanized has been cured to a state in which the physical properties of the rubber are developed to impart elastomeric properties to the rubber generally associated with the rubber in its conventional vulcanized state. The degree of cure of the vulcanized rubber can be described in terms of extractable components. Using this measure of the degree of cure, the improved thermoplastic elastomeric compositions may be produced by vulcanizing the curable rubber component of the blends to the extent that the composition contains no more than 6% by weight of the cured rubber component extractable at room temperature by a solvent which dissolves the rubber which is intended to be vulcanized, and preferably to the extent that the composition contains less than three percent by weight extractable.

The thermoplastic elastomer can be fully or partially vulcanized with various vulcanization systems. The rubber in the TPV can be vulcanized with any vulcanization system that is known in the art. Suitable curing methods may include, among others, peroxide cure, sulfur cure, resin cure, and hydrosilylation cure. The curing method selected may depend on the TPV formulation as it is known that certain elastomers will respond more efficiently to specific curing methods. Suitable curing agents and co-agents may be used in amounts that are well known in the art. In general, suitable vulcanization agents and systems are described by V. Smits and T. Mateme in TPE 2005 RAPRA CONFERENCE PROCEEDINGS, Berlin, Germany, Paper 4, 14-15 (September, 2005).

In general, the amount of curing agent used will depend upon the desirable balance of processability, physical properties, adhesion strength, and cost of the blend composition. To obtain a partial cure, the curing agent can vary from 1-99%, preferably 5-75% and more preferably 10-40% of the amount necessary for a substantially complete cure or crosslinking. The exact amount of curing agent is determined by the formulator taking into consideration such factors as the final method of fabricating the blend and the balance of properties desired for its end use. In using the limited amounts for curing agents or curatives, the mixing temperature of the blend containing the curing agent, the filler, if any, and elastomers are selected so that whatever amount of curing agent is employed, it is substantially consumed during the reaction.

Conventional methods of blending the TPV may be selected. The TPV may be produced in a single or a two pass process. In a single process, the rubber, polyolefin and polyamide (where present) may be combined and processed in a single step. In the two pass process, the rubber and polyolefin may be melt blended in the presence of the curing agent with the resultant TPV then melt blended with the polyamide.

The thermoplastic vulcanizate may have a hardness of between 20 and 90 Shore A, and preferably between 35 and 85 Shore A, and more preferably between 45 and 75 Shore A and still more preferably between 65 and 75 Shore A. Hardness values of less than 65 may be achieved, and in alternated embodiments, less than 55, and in still other embodiments less than 45, and in still other embodiments, less than 35, and in still other embodiments, less than 25.

The thermoplastic elastomer composition of the present invention can be applied to a diverse range of substrates. The substrates can include, for instance, polar substrates such as those based on polar polymers, such as engineering resins, and inorganic materials, such as glass or metal. Preferable engineering resins include various polyamides of which Nylon 6 and Nylon 66 are exemplary, including related glass filled resins. It is not necessary for the polar substrate to be chemically reacted with the applied TPV. Suitable substrates may include blends of engineering resins with polyamides (like polypropylene/polyamide alloys or an ABS/polyamide alloy (ABS being a core/shell plastic, with polystyrene-co-acrylonitrile) encapsulating a polybutadiene core).

Polymeric substrates, e.g. a polar material, can include automotive parts, such as body panels comprised of polymeric compositions, such as blends, semi-interpenetrating polymer networks, or full interpenetrating polymer networks, which can contain, for instance, polar polymers (polyamides etc.) alone or in combination with additional polymers such as polyureas or polyurethanes. A sufficiently polar polymeric substrate is adherent to a composition according to the present invention.

Other useful products include those having engineering substrates but which require a softer hand feel, such as knife handles, power and hand tool covers and handles and the like. For instance, the present compositions are readily formulated for overmolding at least a portion of drill handle casings of nylons or other engineering substrates. The drill handles can be for smaller hand drills, larger industrial fastener tools, or other power tools. Overmolding can be accomplished in different manners including co-extrusion overmolding.

The present invention therefore further includes articles comprising a substrate in combination with one or more layers or connections which are formed, in whole or in part, from the present TPV composition. The substrate can be covered in whole or in part with one or more layers. Such articles include drill handles, automobile parts (metal or polymeric substrates), and the like. Those articles can be made by different plastic processing techniques, like injection overmolding, 2-shot injection molding, co-extrusion (like co-extrusion with nylon (-blends)), blow molding (like multilayer blow molding with nylon) and the like. The thermoplastic elastomer composition can preferably be used as the base material for a glass run channel; a polyamide co-extruded therewith can provide low friction. Common internal thermoplastic lubricants can be used to further improve the abrasion resistance and reduce the coefficient of friction of the polyamide. These include: poly(tetrafluoroethylene), poly(methylsiloxane), molybdenum disulfide, graphite powder and different multiple lubricant systems (e.g. a combination of polytetrafluoroethylene and an other solid polymer lubricant).

Thus, one aspect of the present invention is directed to a method of bonding thermoplastic elastomer and a substrate, the method comprising contacting the thermoplastic elastomer with the substrate, the substrate at a temperature of from less than 40° C. or 35° C. or 30° C., the thermoplastic elastomer comprising an elastomer comprising a rubber selected from the group consisting of conjugated diene rubber, unsaturated styrenic triblock copolymer rubber, hydrogenated styrenic triblock copolymer rubber and blends thereof; and a plastic phase comprising greater than 80% by weight of an anhydride functionalized polyolefin; wherein the polyolefin is selected from the group consisting of polypropylene, polyethylene, poly(1-butene), poly(4-methyl-1-pentene) and blends thereof. The elastomer and plastic phases may further comprise other features as described in the embodiments above for the composition itself.

In yet another embodiment of the process of the invention, a step of addition of an adhesive to the substrate, thermoplastic elastomer, or both is absent. That is, the thermoplastic elastomer or the thermoplastic vulcanizate can be bound directly to the substrate without the use of adhesive materials as is common in the art. In yet another embodiment, the substrate is not pretreated. Common pretreatment methods are known in the art and include, for example, solvent etching, sulfuric acid or chromic acid etching, sodium treatment, ozone treatment, flame treatment, UV irradiation, and plasma treatment.

As used herein, the terms "bound", "bonded" and "bond" refers to the state in which the substrate, preferably a polar substrate, and the thermoplastic elastomer or TPV materials are secured to one another by any appropriate means such as by an inherent tendency of the materials to adhere to one another, or by inducing the materials to adhere as by a heating (or "heat fusing") the thermoplastic elastomer or TPV, radiative, chemical, or some other appropriate process. For example, the TPV or thermoplastic elastomers of the invention may be melt processed as by injection molding and bonded on to the substrate.

While it is contemplated that the substrate may be heated prior to overmolding with the exemplary TPVs of the present invention, it is expressly contemplated that excellent adherence may be achieved without heating the substrate. The substrate may remain at ambient temperature up to the point of overmolding. In a preferred method, the substrate is not independently heated by any means.

EXAMPLES

In support of the compositions and methods of the present invention, the following Examples are offered.

For purposes of the Examples, the following preparation method was used:

Thermoplastic vulcanizates (TPVs) were prepared in a 53 mm co-rotating and intermeshing twin screw extruder (TSE) with 12 barrel sections. A melt gear pump was used to feed the product melt past the TSE die and into an underwater pelletizer for product finishing.

Plastic pellets, and a mixture of granulated rubber, clay, and zinc oxide was metered into the feed throat of the extruder. After an intimate melt blend of the components was produced by intensive melt mixings, under appropriate temperature conditions resulting from a combination of barrel temperature control and shear heating, the melt was devolatilized. The silicone hydride curative was added to the melt prior to the devolatalization step. After melt devolatalization, the platinum catalyst was added to initiate the dynamic vulcanization process. The TPV melt was then stranded and pelletized after a final devolatalization step.

For purposes of the Examples the following materials were used:

| | Elastomers |
|---|---|
| VX1696 | ExxonMobil Chemical Co. EP(VNB)DM, ethylene 63%, propylene 36.3%, 0.7% VNB, by weight, preblended with 100 phr Chevron 6001R paraffinic oil |
| Septon 8007 | Kuraray Co. 29 wt % styrene, Viscosity (10 wt % toluene solution, 30° C.) = 25 cP |
| Exxcelor VA1803 | Maleated EP rubber. EPR-g-0.7 wt % MAH MFR (2.16 kg@230° C.) = 3 |
| | Plastic Materials |
| Polybond 3000 | Chemtura Corp. iPP-g-1.0 wt. % MAH MI = 400 (2.16 kg, 190° C.) |
| Polybond 3200 | Chemtura Corp. iPP-g-1.0 wt % MAH MI = 100 (2.16 kg, 190° C.) |
| Fusabond P MD353D | DuPont. Maleated propylene/ethylene random copolymer, m.p. 136° C., MI = 450 (2.16 kg, 190° C.) |
| Fusabond A EB560D | DuPont. Maleated ethylene/butylacrylate copolymer, m.p. 94° C., MI = 5.6 (2.16 kg, 190° C.) |
| | Rubber Curatives |
| DC 2-5084 | Dow Corning. Trimethylsilyloxy terminated polymethylhydrogensiloxane-co-methyl n-octylsiloxane (DP = 18). |
| PC 085 (0.22 wt % in oil) | ~2.2 wt % Pt in $D_4$ methylvinylsiloxanes, diluted in paraffinic oil, United Chemical Technologies. |
| ZnO | Scorch retarder and heat stabilizer |
| | Polyamides |
| Ultramid B3 | BASF. Nylon 6, 85D; Injection Molding Grade |
| Elvamide 8063R | DuPont. Nylon terpolymer, m.p. 158° C., 75D |
| | Other Materials |
| Icecap K Clay | Burgess calcined clay. |

TABLE 1

| | Example 1 | | | |
|---|---|---|---|---|
| components | Sample 1 | Sample 2 | 191-55 PA | 8291-55 PA |
| VX1696 | 200 | 200 | | |
| Icecap K clay | 12.0 | 12.0 | | |
| ZnO | 2.00 | 2.00 | | |
| DC 2-5084 | 2.50 | 2.50 | | |
| PC 085 (0.22 wt % in oil) | 2.50 | 2.50 | | |
| Polybond 3000 (iPP-g~1 wt % MAH) | 35.0 | 35.0 | | |
| Ultamid B3 (nylon 6, 85D) | 35.0 | — | | |
| Elvamide 8063R (Nylon terpolymer m.p. 158° C., 75D) | — | 35.0 | | |
| Properties | | | | |
| Hardness (Shore A) | 65 | 54 | 55 | 55 |
| UTS (psi) | 381 | 249 | | |
| UE (%) | 233 | 259 | | |
| LCR (Pa · s@ 1200 $s^{-1}$, 204° C.) | 113 | 92 | | |

TABLE 1-continued

Example 1

| components | Sample 1 | Sample 2 | 191-55 PA | 8291-55 PA |
|---|---|---|---|---|
| TS (%) | 14 | 16 | | |
| PA-6 adhesion (pli) | >17*/>20** | >15*/>20** | 3 | 5 |

TPV hardness depends upon injection molded surface morphology and nylon hardness
*Tab failure
**Aged 1 week in DI H$_2$O at room temperature In Example 1, TPVs were prepared in a one pass method combining EPDM rubber as the rubber phase and maleated iPP plus nylon as the components forming the TPV plastic phase. Specifically, in Samples 1 and 2, 100 parts of EPDM rubber (VX1696) were blended with 35 parts of 1.0 wt. % maleated isotactic polypropylene (Polybond 3000) and in Sample 1, 35 parts of an 85 hardness, nylon 6 (Ultramid B3) and in Sample 2, 35 parts of a 75 hardness nylon terpolymer (Elvamide 8063R). TPVs were formed according to the preparation methods disclosed above. Each of TPV Sample 1 and Sample 2 were injection molded over cold nylon inserts. By "cold" it is meant that the nylon inserts were not heated above ambient temperature, which was less than 30° C. To test the adhesion, the following process was used.

Nylon-6 inserts ("T"-bars) were first molded using an Engle 80 ton injection molding machine (Melt and mold temperatures were 525° F. and 90° F. respectively). The "vertical" strip of the "T" (4"×1"×0.13") was attached to the centerline and perpendicular to the rectangular "T"-top (4"× 1"×0.01"). The vertical strip was tapered in thickness, the thickness varying from 0.13" at the base to 0.095" at the end, in order to facilitate removal from the mold.

Test TPV samples were overmolded over the cold nylon "T" bars to yield a composite structure having a 0.06" thick layer of the TPV coating the top of the "T", and with a tapered tab of the TPV (0.15" thick at the base) being molded perpendicular to the "T" nylon insert top, and flush with, and away from the "T" centerline strip.

The "T" centerline strip and the TPV "tab" were clamped in a Monsanto Tensometer 10 instrument to conduct the 90° "peel" adhesion test. In case of "tab" failure, the maximum force (per inch of specimen width) was recorded. When "peeling" occurred, force data points were averaged across the peel length, beginning from the peel length corresponding to half-way up to the initial force plateau, and ending at a peel length where the peel force was half-way below the trailing force plateau.

In all cases, the average "peel" value over three samples was recorded. Samples were also tested after aging in deionized water for one week at room temperature. Aged samples were dried overnight at room temperature before testing.

Testing adhesion (peel force) in both Sample 1 and Sample 2 yielded a tab failure. With respect to Sample 1, tab failure occurred at 17 pounds per linear inch. With respect to Sample 2, tab failure occurred at 15 pounds per linear inch.

Tab failure with respect to each of the aged Sample TPVs occurred at 20 pounds per linear inch.

It is noted that the two Sample formulations had hardness values of 65 and 54 (Shore A) respectively. The softer Elvamide nylon allowed the preparation of the softer TPVs. To demonstrate relative adhesion of the sample preparations to commercially available nylon bondable grades of EPDM TPVs having similar hardnesses, commercially available TPV formulations Santoprene™ 191-5SPA and 8291-55PA (available from Advanced Elastomer Systems) were overmolded on to cold nylon inserts. TPV 191-55PA, which is a 55 Shore A hardness EPDM\isotactic polypropylene TPV blended with an amount of maleated isotactic polypropylene and nylon yielded a peel force with a cold nylon insert of 3 pounds per linear inch. TPV formulation 8291-55PA, which is similarly an EPDM\iPP TPV blended with an amount of maleated isotactic polypropylene and nylon and having a hardness of 55 Shore A, yielded a peel force with respect to the cold nylon insert of five pounds per linear inch.

TABLE 2

Example 2

| components | Mb1 | Sample 3 |
|---|---|---|
| VX1696 | 200 | |
| Icecap K clay | 12.0 | |
| ZnO | 2.00 | |
| Polybond 3000 (iPP-g~1 wt % MAH) | 35.0 | |
| Chevron 6001R | 40.0 | |
| DC 2-5084 | 3.0 | |
| PC 085 (0.22 wt % in oil) | 2.50 | |
| Total | 294.50 | |
| Mb1 | | 294.50 |
| Ultramid B3 (nylon 6, 85D) | | 35.0 |
| Properties | | |
| Hardness (Shore A) | 56 | 67 |
| UTS (psi) | 721 | 475 |
| UE (%) | 420 | 239 |
| M100 (psi) | 278 | 3.0 |
| LCR (Pa · s@ 1200 s$^{-1}$, 204° C.) | 87 | 77 |
| TS (%) | 12 | 13 |
| PA-6 adhesion (RT, Insert Molded), pli | | >26** |
| PA-6 Adhesion (RT, Aged after Insert Molding), pli | | >17** |

**Tab Failure

In Example 2, a thermoplastic vulcanizate (Sample 3) was formed in a two-step process. In the first step, a TPV master batch (Mb1) was formed by melt blending the components identified in Table 2. The resultant TPV masterbatch was then melt blended with 35 parts of nylon (Ultramid B3) in a second processing step. Physical property data of both TPV Mb1 and TPV Sample 3 are set forth in Table 2. TPV Sample 3 was overmolded a cold nylon insert as previously described and showed a peel force of greater than 26 pli (to tab failure) and of greater than 17 pli (to tab failure) after aging.

TABLE 3

Example 3

| components | Mb2 | Sample 4 |
|---|---|---|
| VX1696 | 200 | |
| Icecap K clay | 12.0 | |
| ZnO | 2.00 | |
| Polybond 3000 (iPP-g~1 wt % MAH) | 35.0 | |

TABLE 3-continued

Example 3

| components | Mb2 | Sample 4 |
|---|---|---|
| Chevron 6001R | 40.0 | |
| DC 2-5084 | 3.0 | |
| PC 085 (0.22 wt % in oil) | 3.0 | |
| Total | 295 | |
| Mb2 | | 295 |
| Ultramid B3 (nylon 6, 85D) | | 30.0 |
| Exxcelor VA1803 (Maleated EP rubber) | | 10.0 |
| Properties | | |
| Hardness (Shore A) | 55 | 57 |
| UTS (psi) | 599 | 438 |
| UE (%) | 330 | 284 |
| M100 (psi) | 246 | 233 |
| LCR (Pa · s@ 1200 s$^{-1}$, 204° C.) | 105 | 92 |
| TS (%) | 8 | 8 |
| PA-6 adhesion (RT, Insert Molded), pli | | >39** |
| PA-6 Adhesion (RT, Aged after Insert Molding), pli | | >17** |

**Tab Failure

In Example 3, a TPV Masterbatch (Mb2) was prepared by melt blending the components identified in Table 3 in a first blending step. The resultant TPV Mb2 was then blended with 30 parts of nylon (Ultramid B3) and 10 parts of maleated EP rubber (Exxcelor VA1803) to form TPV Sample 4. The maleated EP rubber was blended into the TPV to reduce hardness. The respective physical properties of Mb2 and Sample 4 are set forth in Table 3. TPV Sample 4 was overmolded a cold nylon insert as previously described and showed a peel force of greater than 39 pli (to tab failure) and of greater than 17 pli (to tab failure) after aging.

TABLE 4

Example 4

| components | Mb3 | Sample 5 |
|---|---|---|
| VX1696 | 200 | |
| Icecap K clay | 12.0 | |
| ZnO | 2.00 | |
| Fusabond PMD353D | 35.0 | |
| Chevron 6001R | 40.0 | |
| DC 2-5084 | 3.0 | |
| PC 085 (0.22 wt % in oil) | 3.0 | |
| Total | 295 | |
| Mb3 | | 295 |
| Ultramid B3 (nylon 6, 85D) | | 35.0 |
| Properties | | |
| Hardness (Shore A) | 50 | 56 |
| UTS (psi) | 681 | 565 |
| UE (%) | 373 | 280 |
| M100 (psi) | 206 | 235 |
| LCR (Pa · s@ 1200 s$^{-1}$, 204° C.) | 112 | 96 |
| TS (%) | 8 | 8 |
| PA-6 adhesion (RT, Insert Molded), pli | | >15** |
| PA-6 Adhesion (RT, Aged after Insert Molding), pli | | >16** |

**Tab Failure

Example 4 illustrates a methodology to achieve a soft, nylon bondable TPV by reducing the hardness of the functionalized polyolefin. TPV Masterbatch (Mb3) was formed with a maleated propylene/ethylene random copolymer (Fusabond PMD353D) in place of the Polybond 3000 of Example 2. TPV Mb3 was blended with nylon (Ultramid B3) to form TPV Sample 5, which yielded a peel force with respect to nylon on overmolding (to tab failure), of greater than 15 pli, and after aging, greater than 16 pli (to tab failure).

TABLE 5

Example 5

| components | Mb4 | Sample 6 |
|---|---|---|
| VX1696 | 200 | |
| Icecap K clay | 12.0 | |
| ZnO | 2.00 | |
| Polybond 3200 | 35.0 | |
| Chevron 6001R | 40.0 | |
| DC 2-5084 | 3.0 | |
| PC 085 (0.22 wt % in oil) | 3.0 | |
| Total | 295 | |
| Mb4 | | 295 |
| Ultramid B3 (nylon 6, 85D) | | 35.0 |
| Properties | | |
| Hardness (Shore A) | 57 | 63 |
| UTS (psi) | 772 | 633 |
| UE (%) | 378 | 311 |
| M100 (psi) | 287 | 293 |
| LGR (Pa · s@ 1200 s$^{-1}$, 204° C.) | 91 | 87 |
| TS (%) | 10 | 10 |
| PA-6 adhesion (RT, Insert Molded), pli | | 2 |
| PA-6 Adhesion (RT, Aged after Insert Molding), pli | | 2 |

In Example 5, TPV Sample 6 was formed by means of a two-step process. First, a masterbatch (Mb4) was formed with 35 parts of Polybond 3200 as the plastic phase. TPV Mb4 was then blended with 35 parts of nylon (Ultramid B3) to yield a TPV having the physical properties described in Table 5. The peel force of TPV Sample 6 with respect to nylon was 2 pli and following aging, remained at 2 pli.

This example demonstrates that as between Polybond 3200 and Polybond 3000, adhesion was poorer in the Polybond 3200 which has a comparatively higher molecular weight but the same weight percent of MAH. The increased molecular weight of the Polybond 3200 results in a reduced melt flow as compared to the Polybond 3000. Improved plastic phase melt flow is believed to contribute to improved bonding as demonstrated by comparison of the previous examples with Example 5.

TABLE 6

Example 6

| components | Sample 7 | Sample 8 |
|---|---|---|
| Septon 8007 | 100 | 100 |
| Fusabond PMD353D | 50.0 | 100 |
| Properties | | |
| Hardness (Shore A) | 50 | 79 |
| UTS (psi) | 519 | 573 |
| UE (%) | 469 | 289 |
| M100 (psi) | 212 | 477 |
| LCR (Pa · s@ 1200 s$^{-1}$, 204° C.) | 12 | 13 |
| TS (%) | 11 | 18 |
| PA-6 adhesion (RT, Insert Molded), pli | 22 | 15 |
| PA-6 Adhesion (RT, Aged after Insert Molding), pli | 18 | 15 |

In Example 6, Samples 7 and 8, comprising Septon 8007 (a styrene/ethylene-butaliene/styrene rubber) and Fusabond PMD353D (in 50 and 100 parts respectively) were formed in a one-step process. The respective physical properties of Samples 7 and 8 are set forth in Table 6 with their respective aged and unaged peel forces.

These Examples demonstrate that soft elastomeric compositions comprising functionalized polyolefins as essentially the entire plastic phase of the composition yield high peel forces with respect to cold polar inserts, such as nylon inserts, as compared to commercially available nylon bondable grades of TPV.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

In one aspect, the various embodiments of the invention can be thus described:

1. A thermoplastic elastomer comprising:
    an elastomer comprising a rubber selected from the group consisting of conjugated diene rubber, unsaturated styrenic triblock copolymer rubber, hydrogenated styrenic triblock copolymer rubber and blends thereof; and
    a plastic phase comprising greater than 80% by weight of an anhydride functionalized polyolefin; wherein the polyolefin is selected from the group consisting of polypropylene, polyethylene, poly(1-butene), poly(4-methyl-1-pentene) and blends thereof.
2. The thermoplastic elastomer of embodiment 1 wherein the polyolefin comprises greater than 90% by weight of the functionalized polyolefin; and wherein the functional group in the functionalized polyolefin is maleic anhydride.
3. The thermoplastic elastomer of any of the preceding numbered embodiments, wherein the polyolefin comprises greater than 95% by weight of the functionalized polyolefin.
4. The thermoplastic elastomer of any of the preceding numbered embodiments, wherein the plastic phase further comprises a polyamide.
5. The thermoplastic elastomer of embodiment 4, wherein the polyamide comprises 40 to 60% by weight of the plastic phase.
6. The thermoplastic elastomer of embodiment 4, wherein the polyamide has a relative solution viscosity of between 20 and 50.
7. The thermoplastic elastomer of embodiment 4, wherein the polyamide has a percent crystalline structure of less than 30%.
8. The thermoplastic elastomer of any of the preceding numbered embodiments, wherein the functionalized polyolefin is a melt flow ratio of between 375 to 475 g/10 min (230° C., 2.16 kg).
9. The thermoplastic elastomer of embodiment 4, wherein the peel adhesion at room temperature in pounds per linear inch with respect to a nylon substrate is greater than 5.
10. The thermoplastic elastomer of embodiment 9 wherein the peel adhesion is greater than 15.
11. The thermoplastic elastomer of any of the preceding numbered embodiments, wherein the plastic phase consists essentially of the functionalized polyolefin.
12. The thermoplastic elastomer of embodiment 11, wherein the elastomer is styrene/ethylene-butene/styrene rubber.
13. The thermoplastic elastomer of any of the preceding numbered embodiments, further comprising a polyamide; and an amount of polyamide plasticizer.
14. The thermoplastic elastomer of embodiment 13, wherein the amount of polyamide plasticizer is from 5% to 25% by weight with respect to the total polyamide.
15. The thermoplastic elastomer of any of the preceding embodiments, wherein the thermoplastic elastomer is bound to a substrate to form an article of manufacture.
16. The thermoplastic elastomer of embodiment 15, wherein the substrate is not pretreated.
17. The thermoplastic elastomer of embodiment 15, wherein the adhesives are absent.
18. A method of bonding thermoplastic elastomer and a substrate, the method comprising contacting the thermoplastic elastomer with the substrate, the substrate at a temperature of from less than 40° C., the thermoplastic elastomer comprising any of the preceding numbered embodiments.

Another aspect of the invention can be described by these various embodiments:

19. A thermoplastic vulcanizate comprising:
    an elastomer comprising a rubber selected from the group consisting of ethylene/alpha-olefin rubber, ethylene/alpha-olefin/non-conjugated diene rubber and blends thereof;
    a plastic phase comprising greater than 80% by weight of an anhydride functionalized polyolefin; wherein the polyolefin is selected from the group consisting of polypropylene, polyethylene, poly(1-butene), poly(4-methyl-1-pentene) and blends thereof; and
    a polyamide.
20. The thermoplastic vulcanizate of embodiment 19, wherein the elastomer comprises from 20% to 80% by weight with respect to the total of the elastomer and the plastic phase; the plastic phase comprises from 80% to 20% by weight with respect to the total of the elastomer plus the plastic phase; the polyamide comprises from 40% to 60% by weight with respect to the total plastic phase; and the functionalized polyolefin comprises from 60 to 40% by weight with respect to the total plastic phase.
21. The thermoplastic vulcanizate of any of the preceding numbered embodiments 19-20, wherein the plastic phase consists essentially of the functionalized polyolefin and the polyamide.
22. The thermoplastic vulcanizate of any of the preceding numbered embodiments 19-21, wherein the functional group in the functionalized polyolefin is maleic anhydride.
23. The thermoplastic vulcanizate of any of the preceding numbered embodiments 19-22, wherein the elastomer comprises EPDM rubber; and wherein the functionalize polyolefin is maleated polypropylene.
24. The thermoplastic vulcanizate of any of the preceding numbered embodiments 19-23, having a Shore A of less than 55.
25. The thermoplastic vulcanizate of any of the preceding numbered embodiments 19-24, further comprising maleated EP rubber.
26. The thermoplastic vulcanizate of any of the preceding numbered embodiments 19-25, further comprising less than 150 phr of processing oil selected from the group consisting of polyisobutylene oil, paraffinic oil, naphthenic oil, and blends thereof.
27. The thermoplastic vulcanizate of embodiment 26, wherein the peel adhesion at room temperature in pounds per linear inch with respect to a nylon substrate is greater than 5.
28. The thermoplastic elastomer of any of the preceding embodiments 19-27, wherein the thermoplastic elastomer is bound to a substrate to form an article of manufacture.
29. The thermoplastic elastomer of embodiment 28, wherein the substrate is not pretreated.
30. The thermoplastic elastomer of embodiment 28, wherein the adhesives are absent.
31. A method of bonding thermoplastic elastomer and a substrate, the method comprising contacting the thermoplastic elastomer with the substrate, the substrate at a temperature of from less than 40° C., the thermoplastic elastomer comprising any of the preceding numbered embodiments 19-30.

Another aspect of the invention is directed towards the use of a thermoplastic elastomer in an article of manufacture such as a handle, the thermoplastic elastomer comprising an elastomer comprising a rubber selected from the group consisting of conjugated diene rubber, unsaturated styrenic triblock copolymer rubber, hydrogenated styrenic triblock copolymer rubber and blends thereof; and a plastic phase comprising greater than 80% by weight of an anhydride functionalized polyolefin; wherein the polyolefin is selected from the group consisting of polypropylene, polyethylene, poly(1-butene), poly(4-methyl -1-pentene) and blends thereof.

Yet another aspect of the invention is directed towards the use of a thermoplastic vulcanizate in an article of manufacture such as a handle, the thermoplastic vulcanizate comprising: an elastomer comprising a rubber selected from the group consisting of ethylene/alpha-olefin rubber, ethylene/alpha-olefin/non-conjugated diene rubber and blends thereof; a plastic phase comprising greater than 80% by weight of an anhydride functionalized polyolefin; wherein the polyolefin is selected from the group consisting of polypropylene, polyethylene, poly (1-butene), poly(4-methyl-1-pentene) and blends thereof; and a polyamide.

We claim:

1. An article of manufacture comprising:
   a substrate comprising a polar material, wherein the substrate comprises the surface of a tool handle or an automotive body panel; and
   a thermoplastic elastomer at least partially disposed directly on the substrate, the elastomer comprising:
      a rubber selected from the group consisting of conjugated diene rubber, unsaturated styrenic triblock copolymer rubber, hydrogenated styrenic triblock copolymer rubber and blends thereof; and
      a plastic comprising:
         one or more polyolefins, wherein the total polyolefin content of the plastic comprises greater than 80% by weight of an anhydride functionalized polyolefin and an unmodified polyolefin present up to 20 wt%; wherein the functionalized polyolefin is selected from the group consisting of polypropylene, polyethylene, poly(1-butene), poly(4-methyl-1-pentene) and blends thereof, and
         a polyamide.

2. The article of claim 1 wherein the plastic comprises greater than 90% by weight of the functionalized polyolefin; and wherein the functional group in the functionalized polyolefin is maleic anhydride.

3. The article of claim 2, wherein the plastic comprises greater than 95% by weight of the functionalized polyolefin.

4. The article of claim 1, wherein the plastic comprises no more than 20% by weight of the polyamide.

5. The article of claim 4, wherein the polyamide has a number average molecular weight (Mn) of about 25,000 to about 80,000.

6. The article of claim 4, wherein the polyamide has a percent crystalline structure of less than 30%.

7. The article of claim 1 wherein the functionalized polyolefin has a melt flow rate of between 375 g/10min to 475 g/10 min (230° C., 2.16 kg).

8. The article of claim 1, wherein the elastomer has a peel adhesion to the substrate at room temperature in pounds per linear inch greater than 5.

9. The article of claim 8 wherein the peel adhesion is greater than 15.

10. The article of claim 1, wherein the rubber is styrene/ethylene-butene/styrene rubber.

11. The article of claim 10, wherein the plastic further comprises a polyamide; and an amount of polyamide plasticizer.

12. The article of claim 11, wherein the amount of polyamide plasticizer is from 5% to 25% by weight with respect to the total polyamide.

13. An article of manufacture comprising:
   a substrate comprising a polar material; and
   a thermoplastic vulcanizate at least partially disposed directly on the substrate, the thermoplastic vulcanizate comprising:
      a dispersed rubber phase selected from the group consisting of ethylene/alpha-olefin rubber, ethylene/alpha-olefin/non-conjugated diene rubber and blends thereof; and
      a plastic phase comprising one or more polyolefins, wherein the total polyolefin content of the plastic phase comprises greater than 80% by weight of an anhydride functionalized polyolefin and an unmodified polyolefin present up to 20 wt%; wherein the functionalized polyolefin is selected from the group consisting of polypropylene, polyethylene, poly(1-butene), poly(4-methyl-1-pentene) and blends thereof, and wherein the plastic phase further comprises a polyamide, wherein the polyamide has a percent crystalline structure of less than 30%;
   wherein the polar material comprises polyamide.

14. The article of claim 13, wherein:
   the thermoplastic vulcanizate comprises:
      from 20% to 80% by weight of the rubber, based on the total weight of the thermoplastic vulcanizate;
      from 80% to 20% by weight of the plastic phase, based on the total weight of the thermoplastic vulcanizate.

15. The article of claim 14, wherein the plastic phase consists essentially of the functionalized polyolefin and the polyamide.

16. The article of claim 15, wherein the functional group in the functionalized polyolefin is maleic anhydride.

17. The article of claim 16, wherein the rubber phase comprises EPDM rubber; and wherein the functionalized polyolefin is maleated polypropylene.

18. The article of claim 17, wherein the thermoplastic vulcanizate has a Shore A of less than 55.

19. The article of claim 13, wherein the rubber phase comprises maleated EP rubber.

20. The article of claim 13 further comprising less than 150 phr of processing oil selected from the group consisting of polyisobutylene oil, paraffinic oil, naphthenic oil, and blends thereof.

21. The article of claim 18, wherein the thermoplastic vulcanizate has a peel adhesion to the substrate at room temperature in pounds per linear inch greater than 5.

22. The article of claim 1, wherein the substrate is not pretreated, and an adhesive is absent.

23. The article of claim 13, wherein the substrate is not pretreated, and an adhesive is absent.

24. The article of claim 1, wherein the polar material comprises polyamide.

* * * * *